US012577331B2

(12) United States Patent
Otomo

(10) Patent No.: US 12,577,331 B2
(45) Date of Patent: Mar. 17, 2026

(54) RESIN COMPOSITION

(71) Applicant: NAMICS CORPORATION, Niigata (JP)

(72) Inventor: Masayoshi Otomo, Niigata (JP)

(73) Assignee: NAMICS CORPORATION, Niigata (JP)

( * ) Notice: Subject to any disclaimer, the term of this patent is extended or adjusted under 35 U.S.C. 154(b) by 915 days.

(21) Appl. No.: 17/784,987

(22) PCT Filed: Dec. 9, 2020

(86) PCT No.: PCT/JP2020/045820
§ 371 (c)(1),
(2) Date: Jun. 13, 2022

(87) PCT Pub. No.: WO2021/125008
PCT Pub. Date: Jun. 24, 2021

(65) Prior Publication Data

US 2023/0043084 A1 Feb. 9, 2023

(30) Foreign Application Priority Data

Dec. 16, 2019 (JP) ................................. 2019-226531

(51) Int. Cl.
*C08F 22/10* (2006.01)
*C08K 3/08* (2006.01)

(52) U.S. Cl.
CPC ............ *C08F 22/1006* (2020.02); *C08K 3/08* (2013.01); *C08K 2003/0806* (2013.01); *C08K 2003/085* (2013.01)

(58) Field of Classification Search
CPC ...... C08F 22/1006; C08F 122/14; C08F 2/44; C08F 292/00; C08F 22/10; C08K 3/08; C08K 2003/0806; C08K 2003/085; C08K 2201/001; C08K 9/04; C09J 4/00; C09J 9/02; H01L 23/552; H01L 23/295; H01B 1/22; C08L 35/02
See application file for complete search history.

(56) References Cited

U.S. PATENT DOCUMENTS

| | | | | |
|---|---|---|---|---|
| 2013/0281580 | A1 | 10/2013 | Malofsky et al. | |
| 2016/0068616 | A1 | 3/2016 | Palsule et al. | |
| 2016/0347871 | A1 | 12/2016 | Stevenson et al. | |
| 2017/0243849 | A1 * | 8/2017 | Sasaki | C09J 11/06 |
| 2020/0148922 | A1 * | 5/2020 | Arai | H01L 23/562 |
| 2020/0283551 | A1 | 9/2020 | Arai et al. | |

FOREIGN PATENT DOCUMENTS

| | | | | |
|---|---|---|---|---|
| JP | 2014503474 | A | 2/2014 | |
| JP | 2017036361 | A | 2/2017 | |
| JP | 2017527667 | A | 9/2017 | |
| JP | 2018516299 | A | 6/2018 | |
| JP | 2018517809 | A | 7/2018 | |
| WO | 2016205605 | A1 | 12/2016 | |
| WO | WO-2018212330 | A1 * | 11/2018 | H01L 23/10 |
| WO | 2019088102 | A1 | 5/2019 | |
| WO | WO-2019129537 | A1 * | 7/2019 | C04B 41/009 |

OTHER PUBLICATIONS

Extended European Search Report (EESR) dated Nov. 30, 2023, issued in counterpart European Application No. 20902483.5.
International Search Report (ISR) (and English translation thereof) dated Feb. 22, 2021, issued in International Application No. PCT/JP2020/045820.
Written Opinion dated Feb. 22, 2021, issued in International Application No. PCT/JP2020/045820.

* cited by examiner

*Primary Examiner* — Doris L Lee
(74) *Attorney, Agent, or Firm* — Holtz, Holtz & Volek PC

(57) ABSTRACT

A resin composition suppresses unintended curing of a 2-methylene-1,3-dicarbonyl compound in the presence of conductive particles to facilitate the production of a paste including the 2-methylene-1,3-dicarbonyl compound for electronic components. The resin composition includes (a) at least one 2-methylene-1,3-dicarbonyl compound, (b) at least one type of conductive particles and (c) at least one monocarboxylic acid with a number of carbon atoms of 3 or more.

19 Claims, No Drawings

RESIN COMPOSITION

TECHNICAL FIELD

The present invention relates to a resin composition. The present invention also relates to a method for suppressing polymerization of a 2-methylene-1,3-dicarbonyl compound.

BACKGROUND ART

A conductive paste, which comprises a curable resin composition combined with conductive particles (especially, metal particles such as silver particles), is used for manufacturing electronic components and/or semiconductor devices as, for example, an adhesive for adhesion at portions in which electrical conductivity and/or thermal conductivity is/are necessary. Such a conductive paste provides an advantage of adhesion at a temperature lower than that for soldering.

As known reactions applicable to curing at a low temperature, there can be mentioned polyaddition by urethanization, ene-thiol reaction, cationic polymerization, radical polymerization and the like. However, polyaddition by urethanization has difficulty in achieving complete curing within a short time because of low reaction rate. Ene-thiol reaction is difficult to apply to a conductive paste because of the problem of corrosion of metal caused by a thiol compound used therein. Cationic polymerization (except for living cationic polymerization carried out under special conditions) has difficulty in control of reaction because of low stability of the growing species. Radical polymerization has a problem of difficulty in application to curing under the atmosphere because of inhibition by oxygen, which is likely to cause insufficient curing particularly at the surface.

In contrast, a 2-methylene-1,3-dicarbonyl compound, such as methylene malonate, is cured by anionic polymerization using a basic substance as an initiator. A curable resin composition comprising the 2-methylene-1,3-dicarbonyl compound is cured in a short time even at a low temperature, such as room temperature, and this resin composition is useful for avoiding an adverse effect of heating for curing and improving production efficiency. For this reason, use of the 2-methylene-1,3-dicarbonyl compound, such as methylene malonate, as a curable resin contained in a conductive paste is being studied.

PRIOR ART DOCUMENTS

Patent Documents

Patent Document 1: JP 2017-527667
Patent Document 2: JP 2018-517809

SUMMARY OF THE INVENTION

Problem to be Solved by the Invention

However, as a result of various studies of the present inventors for developing a paste for electronic components using a 2-methylene-1,3-dicarbonyl compound, it has been found that when a 2-methylene-1,3-dicarbonyl compound is combined with conductive particles, especially metal particles such as silver particles, the stability (pot life) of the 2-methylene-1,3-dicarbonyl compound is remarkably deteriorated and, despite the absence of an initiator, this compound is disadvantageously cured in a short time. It has been previously unknown that conductive particles induce unintended curing of the 2-methylene-1,3-dicarbonyl compound. Application of the 2-methylene-1,3-dicarbonyl compound to a paste for electronic components is not practical unless such unintended curing is suppressed.

Patent Document 1 and Patent Document 2 describe use of various acids as stabilizers for the 2-methylene-1,3-dicarbonyl compound, as well as the fact that a filler (in particular an inorganic filler, such as metal particles (Patent Document 1)) can be added to the 2-methylene-1,3-dicarbonyl compound. However, in Patent Document 1 and Patent Document 2, unintended curing of the 2-methylene-1,3-dicarbonyl compound as described above in the presence of the conductive particles or suppression of the curing is not described at all.

It is an object of the present invention to provide a resin composition suitable for the production of a paste for electronic components, the resin composition being capable of improving the stability of a 2-methylene-1,3-dicarbonyl compound under the co-existence of conductive particles, in order to solve the above-mentioned prior art problems.

As a result of intensive research to solve the above-mentioned problems, the present inventors have arrived at the present invention.

That is, the present invention includes, but is not limited to, the following inventions:

1. A resin composition comprising the following components (a) to (c):
   (a) at least one 2-methylene-1,3-dicarbonyl compound,
   (b) at least one type of conductive particles, and
   (c) at least one monocarboxylic acid with a number of carbon atoms of 3 or more.
2. The resin composition according to item 1 above, wherein the monocarboxylic acid is a saturated or unsaturated aliphatic monocarboxylic acids.
3. The resin composition according to item 2 above, wherein the saturated or unsaturated aliphatic monocarboxylic acid is linear or branched.
4. The resin composition according to item 2 or 3 above, wherein the number of carbon atoms in the saturated or unsaturated aliphatic monocarboxylic acid is 6 or more.
5. The resin composition according to any one of items 1 to 4 above, wherein the at least one type of conductive particles comprise silver or copper.
6. The resin composition according to any one of items 1 to 5 above, which is used for manufacturing a conductive cured product.
7. A paste for electronic components, which comprises the resin composition of any one of items 1 to 6 above and an initiator comprising at least one basic substance.
8. The paste for electronic components of item 7 above, which can be cured by heating to a temperature of 150° C. or less.
9. A cured product obtained by curing the paste for electronic components of item 7 or 8 above.
10. A semiconductor device comprising the paste for electronic components of item 7 or 8 above, or the cured product of item 9 above.
11. An electromagnetic wave shielding material comprising the cured product of item 9 above.

Effect of the Invention

The resin composition of the present invention comprises, in addition to conductive particles, a monocarboxylic acid with a number of carbon atoms of 3 or more. As mentioned above, conductive particles may induce unintended curing of the 2-methylene-1,3-dicarbonyl compound. However, by the use of the resin composition of the present invention, such unintended curing is suppressed by the monocarboxylic acid, and it becomes possible to produce a paste for electronic components which comprises the 2-methylene-1,3-dicarbonyl compound.

DESCRIPTION OF EMBODIMENTS

Embodiments of the present invention are described below in detail.

The resin composition of the present invention comprises the following components (a) to (c):

(a) at least one 2-methylene-1,3-dicarbonyl compound;

(b) at least one conductive particle; and (c) at least one monocarboxylic acid with a number of the carbon atoms of 3 or more.

Hereinafter, components (a) to (c) above are explained.

2-methylene-1,3-dicarbonyl Compound (Component (a))

The resin composition of the present invention comprises a 2-methylene-1,3-dicarbonyl compound (component (a)). As used herein, the 2-methylene-1,3-dicarbonyl compound is a compound having at least one structural unit represented by formula (I) below:

[Chemical formula 1]

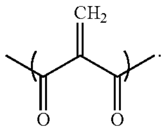

(I)

Component (a) comprises one or two or more structural units of formula (I) above. In some embodiments, component (a) comprises two to six, preferably two, structural units of formula (I) above.

The 2-methylene-1,3-dicarbonyl compound can be used as component (a) in the present invention, because it comprises the structural unit of formula (I) above, and these structural units polymerize with each other in the presence of an initiator, typically a basic substance (the initiator described later). If the 2-methylene-1,3-dicarbonyl compounds comprise 2-methylene-1,3-dicarbonyl compounds that comprise two or more structural units of formula (I) above (multifunctional components), cross-links are formed during curing, and this is expected to result in improvement in physical properties of the cured product, such as enhanced mechanical properties at high temperatures.

Component (a) comprises at least one 2-methylene-1,3-dicarbonyl compound. The 2-methylene-1,3-dicarbonyl compound contained in component (a) preferably has a molecular weight of 180 to 10,000, more preferably 180 to 5,000, even more preferably 180 to 2,000, even more preferably 220 to 2,000, even more preferably 220 to 1,500, even more preferably 240 to 1,500, particularly preferably 250 to 1,500, and most preferably 250 to 1,000. The molecular weight of the 2-methylene-1,3-dicarbonyl compound contained in component (a) and the amount by mass of each 2-methylene-1,3-dicarbonyl compound contained relative to the entire resin composition (or the totality of the 2-methylene-1,3-dicarbonyl compounds in the resin composition) of 1, can be determined, for example, by quantification by means of reversed-phase high performance liquid chromatography (reversed-phase HPLC) using an ODS column as the column and, as the detector, a mass spectrometer (MS) with a PDA (detection wavelength: 190 to 800 nm) or ELSD. If the molecular weight of component (a) is less than 180, the vapor pressure at 25° C. may be excessively high, which may cause various problems arising from volatiles. In particular, volatiles will, on adhering to the components in their vicinity, be cured by bases on the surface, leading to contamination of the components in their vicinity. By contrast, if the molecular weight of component (a) exceeds 10,000, it results in the viscosity of the composition becoming high, which decreases workability and also causes other issues such as imposing limitations on the amount(s) of conductive particles as component (b) and/or other fillers that can be added.

Component (a) may comprise a multifunctional component. Multifunctional herein means that the 2-methylene-1,3-dicarbonyl compound comprises two or more structural units of formula (I) above. The number of the structural units of formula (I) above contained in the 2-methylene-1,3-dicarbonyl compound is referred to as the "number of functional groups" of the 2-methylene-1,3-dicarbonyl compound. Among the 2-methylene-1,3-dicarbonyl compounds, those for which the number of functional groups is one are called "monofunctional," those for which the number of functional groups is two are called "bifunctional," and those for which the number of functional groups is three are called "trifunctional". Since a cured product obtained using component (a) that comprises a multifunctional component is crosslinked, the cured product has improved physical properties, such as heat resistance and mechanical properties at high temperatures. When a multifunctional component is used, the ratio by mass of a multifunctional component is preferably 0.01 or greater relative to the entire resin composition of the present invention of 1. In an embodiment, the ratio of by mass of those of component (a) that comprise two or more structural units represented by formula (I) above is preferably 0.001 to 0.899, more preferably 0.001 to 0.799, even more preferably 0.001 to 0.50, particularly preferably 0.001 to 0.25, relative to the entire resin composition of the present invention of 1.

If component (a) comprises the multifunctional component, a network-like cross-linked structure is formed in the cured product, with the result that the cured product does not flow and maintains a constant storage modulus even at high temperatures, in particular, at temperatures equal to or higher than its glass transition temperature. The storage modulus of the cured product at high temperatures can be measured, for example, by dynamic mechanical analysis (DMA). In general, if a cured product having a cross-linked structure formed therein is evaluated by DMA, a region known as a plateau, the region where changes in storage modulus are relatively small as the temperature changes, is observed over a wide temperature range above its glass transition temperature. The storage modulus in this plateau region is evaluated as a quantity related to crosslink density, i.e., the proportion of the multifunctional component in component (a).

In an embodiment, the ratio by mass of component (a) is preferably 0.01 to 0.899, more preferably 0.05 to 0.799, particularly preferably 0.05 to 0.50, and most preferably 0.05 to 0.25, relative to the entire resin composition of the present invention of 1.

In an embodiment, the 2-methylene-1,3-dicarbonyl compound is represented by formula (II) below:

[Chemical formula 2]

(II)

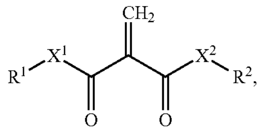

(wherein, $X^1$ and $X^2$ each independently represent a single bond, O or $NR^3$, wherein $R^3$ represents hydrogen or a monovalent hydrocarbon group, $R^1$ and $R^2$ are each independently hydrogen, a monovalent hydrocarbon group or represented by formula (III) below:

[Chemical formula 3]

(III)

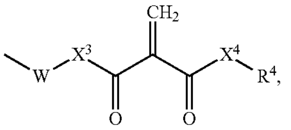

(wherein, $X^3$ and $X^4$ each independently represent a single bond, O or NRS, wherein $R^3$ represents hydrogen or a monovalent hydrocarbon group, W represents a spacer, and $R^4$ represents hydrogen or a monovalent hydrocarbon group)).

In some embodiment, the 2-methylene-1,3-dicarbonyl compound is represented by formula (IV) below:

[Chemical formula 4]

(IV)

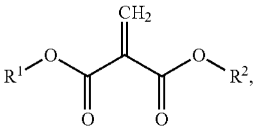

(wherein, $R^1$ and $R^2$ are each independently hydrogen, a monovalent hydrocarbon group or represented by formula (V) below:

[Chemical formula 5]

(V)

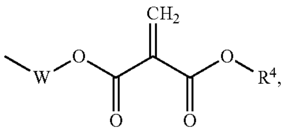

(wherein

W represents a spacer, and $R^4$ represents hydrogen or a monovalent hydrocarbon group)).

In another embodiment, the 2-methylene-1,3-dicarbonyl compound is a dicarbonylethylene derivative represented by formula (VI) below:

[Chemical formula 6]

$$R^{14}-X^{11}\left(R^{12}-X^{12}\right)_m\left[R^{11}\left(X^{12}-R^{12}\right)_m X^{13}\right]_n R^{13}, \quad \text{(VI)}$$

(wherein, $R^{11}$ represents a 1,1-dicarbonylethylene unit represented by formula (VII) below:

[Chemical formula 7]

(VII)

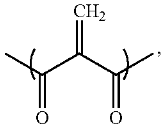

each $R^{12}$ independently represents a spacer, $R^{13}$ and $R^{14}$ each independently represent hydrogen or a monovalent hydrocarbon group, $X^{11}$ and each of $X^{12}$ and $X^{13}$ each independently represent a single bond, O or $NR^{15}$, wherein $R^{15}$ represents hydrogen or a monovalent hydrocarbon group, each m independently represents 0 or 1, and n represents an integer of 1 or more and 20 or less).

As used herein, the term monovalent hydrocarbon group refers to a group generated by removing one hydrogen atom from a carbon atom of a hydrocarbon. As examples of the monovalent hydrocarbon group, there can be mentioned an alkyl group, an alkenyl group, an alkynyl group, a cycloalkyl group, an alkyl-substituted cycloalkyl group, an aryl group, an aralkyl group, and an alkaryl group, and a portion of each of these groups may contain a heteroatom, such as N, O, S, P and Si.

Each of the above-mentioned monovalent hydrocarbon groups may be substituted with alkyl, cycloalkyl, heterocyclyl, aryl, heteroaryl, allyl, alkoxy, alkylthio, hydroxyl, nitro, amide, azide, cyano, acyloxy, carboxy, sulfoxy, acryloxy, siloxy, epoxy or ester.

The above-mentioned monovalent hydrocarbon group is preferably an alkyl group, a cycloalkyl group, an aryl group or an alkyl group substituted with a cycloalkyl group, and more preferably an alkyl group, a cycloalkyl group or an alkyl group substituted with a cycloalkyl group.

There is no particular limitation with respect to the number of carbon atoms in the above-mentioned alkyl group, alkenyl group, and alkynyl group (hereinafter collectively referred to as "alkyl group etc."). The number of carbon atoms in the above-mentioned alkyl group is usually 1 to 18, preferably 1 to 16, more preferably 2 to 12, even more preferably 3 to 10, and particularly preferably 4 to 8. The number of carbon atoms in the above-mentioned alkenyl group and the alkynyl group is usually 2 to 12, preferably 2 to 10, more preferably 3 to 8, even more preferably 3 to 7, and particularly preferably 3 to 6. If the above-mentioned alkyl group etc. have cyclic structure, the number of carbon atoms in the alkyl group etc. is usually 5 to 16, preferably 5 to 14, more preferably 6 to 12, and even more preferably 6 to 10. The number of carbon atoms in the above-mentioned alkyl group etc. can be identified by, for example, reversed-phase HPLC described above or nuclear magnetic resonance technique (NMR technique).

There is no particular limitation with respect to the structure of the alkyl group etc. The above-mentioned alkyl group etc. may be linear or have a side chain. The above-mentioned alkyl group etc. may be a chain structure or may be a cyclic structure (a cycloalkyl group, a cycloalkenyl group, and a cycloalkynyl group). The above-mentioned alkyl group etc. may have one or two or more other substituents. For example, the above-mentioned alkyl group etc. may have a substituent comprising an atom other than a carbon atom or a hydrogen atom as a substituent. Also, the alkyl group etc. may comprise one or two or more atoms other than a carbon atom or a hydrogen atom in a chain structure or a cyclic structure. As examples of the above-mentioned atoms other than a carbon atom or a hydrogen atom, there can be mentioned one or two or more of an oxygen atom, a nitrogen atom, a sulfur atom, a phosphorus atom and a silicon atom.

As specific examples of the above-mentioned alkyl group, there can be mentioned a methyl group, an ethyl group, an n-propyl group, an i-propyl group, an n-butyl group, an i-butyl group, a sec-butyl group, a t-butyl group, a pentyl group, an isopentyl group, a neopentyl group, a hexyl group, a heptyl group, an octyl group, and a 2-ethylhexyl group. As specific examples of the above-mentioned cycloalkyl group. there can be mentioned a cyclopentyl group, a cyclohexyl group, a cycloheptyl group, and a 2-methylcyclohexyl group. As examples of the above-mentioned alkenyl group, there can be mentioned a vinyl group, an allyl group, and an isopropenyl group. As specific examples of the above-mentioned cycloalkenyl group, there can be mentioned a cyclohexenyl group.

When the 2-methylene-1,3-dicarbonyl compound is represented by formula (II) or (IV) above and $R^1$ and $R^2$ are both monovalent hydrocarbon groups, it is particularly preferable that $R^1$ and $R^2$ are each an alkyl group, a cycloalkyl group, an alkyl-substituted cycloalkyl group, an aryl group, an aralkyl group or an alkaryl group with a number of carbon atoms of 2 to 8.

As used herein, the term spacer refers to a divalent hydrocarbon group, more specifically a cyclic, linear or branched, substituted or unsubstituted alkylene group. There is no particular limitation with respect to the number of the number of carbon atoms in the above-mentioned alkylene group. The number of carbon atoms in the above-mentioned alkylene group is usually 1 to 12, preferably 2 to 10, more preferably 3 to 8, and still more preferably 4 to 8. If desired, the above-mentioned alkylene group may comprise, in the middle thereof, a group comprising a heteroatom selected from N, O, S, P, and Si. The above-mentioned alkylene group may have an unsaturated bond. In an embodiment, the spacer is an unsubstituted alkylene group having 4 to 8 carbon atoms. Preferably, the spacer is a linear, substituted or unsubstituted alkylene group, more preferably an alkylene group having a structure represented by the formula $-(CH_2)_n-$ (wherein n is an integer of 2 to 10, preferably 4 to 8), with the carbon atoms at the both ends thereof being bonded to the remaining portion of the 2-methylene-1,3-dicarbonyl compound.

Specific examples of the divalent hydrocarbon group as the above-mentioned spacer include, but are not limited to, a 1,4-n-butylene group and a 1,4-cyclohexylene dimethylene group.

When the 2-methylene-1,3-dicarbonyl compound has a spacer, the number of the carbon atoms in the terminal monovalent hydrocarbon group is preferably 6 or less. That is, when the 2-methylene-1,3-dicarbonyl compound is represented by formula (II) or (IV) above, it is preferred that $R^4$ in formula (III) or (V) above is an alkyl group having 1 to 6 carbon atoms, but when either one of $R^1$ and $R^2$ is represented by formula (III) or (V) above, it is preferred that the other of $R^1$ and $R^2$ is an alkyl group having 1 to 6 carbon atoms. In this case, in formula (II) or (IV) above, both of $R^1$ and $R^2$ may be represented by formula (III) or formula (V) above, and preferably, only one of $R^1$ and $R^2$ is represented by formula (III) or formula (V) above. Preferably, the 2-methylene-1,3-dicarbonyl compound is represented by formula (IV) above.

As examples of particularly preferred compounds having a spacer, there can be mentioned a compound represented by formula (IV) above, wherein one of $R^1$ and $R^2$ is any of an ethyl group, an n-hexyl group and a cyclohexyl group, the other is represented by formula (V) above, W is either 1,4-n-butylene group or a 1,4-cyclohexylene dimethylene group and $R^4$ is any one of an ethyl group, an n-hexyl group and a cyclohexyl group. As examples of other particularly preferred compounds, there can be mentioned a compound represented by formula (IV) above, wherein $R^1$ and $R^2$ are represented by formula (V) above, W is either a 1,4-n-butylene group or a 1,4-cyclohexylene dimethylene group and $R^4$ is any one of an ethyl group, an n-hexyl group or a cyclohexyl group.

A variety of 2-methylene-1,3-dicarbonyl compounds are available from SIRRUS Inc., Ohio, USA, and synthetic methods thereof are disclosed in publications of patent applications such as WO2012/054616, WO2012/054633 and WO2016/040261. If both ends of the structural unit represented by formula (I) above contained in the 2-methylene-1,3-dicarbonyl compound are bonded to oxygen atoms, the 2-methylene-1,3-dicarbonyl compounds having a higher molecular weight in which a plurality of structural units represented by formula (I) above are linked via an ester bond and the above-mentioned spacer can be produced by using methods known in the art, such as the transesterification with a diol or polyol disclosed in Japanese Translation of PCT International Application Publication No. JP-T-2015-518503. The 2-methylene-1,3-dicarbonyl compound thus prepared may comprise a hydroxy group in $R^1$ and $R^2$ in formula (II) or formula (IV) above, $R^4$ in formula (III) or formula (V) above, and $R^{14}$ and $R^{13}$ in formula (VI) above. Component (a), which comprises the 2-methylene-1,3-dicarbonyl compounds, can be obtained, as appropriate, by combining these 2-methylene-1,3-dicarbonyl compounds.

As specific examples of the 2-methylene-1,3-dicarbonyl compounds preferable as component (a), there can be mentioned dibutyl methylene malonate, dipentyl methylene malonate, dihexyl methylene malonate, dicyclohexyl methylene malonate, ethyl octyl methylene malonate, propyl hexyl methylene malonate, 2-ethylhexyl-ethyl methylene malonate, ethylphenyl-ethyl methylene malonate and the like. These are preferable because of their low volatility and high reactivity. From the perspective of handleability, dihexyl methylene malonate and dicyclohexyl methylene malonate are particularly preferable.

(b) Conductive Particles (Component (b))

The resin composition of the present invention comprises conductive particles (component (b)). In the present invention, the conductive particles refers to particles having an average particle diameter of 0.01 to 100 μm and electrical conductivity of $10^6$ S/m or more. The conductive particles may be composed of a conductive substance formed into particles, or may be cores (core particles) each coated with a conductive substance. The above-mentioned cores (core particles) may be composed of a non-conductive substance as long as they are at least partially coated with a conductive substance. Examples of conductive particles include metal powders and coated powders. The conductive particles are used for imparting thermal conductivity and/or electrical conductivity to the resin composition of the present invention.

There is no particular limitation with respect to above-mentioned conductive substance. As examples of such conductive substances, there can be mentioned gold, silver, nickel, copper, palladium, platinum, bismuth, tin and alloys thereof (especially, bismuth-tin alloy, solder and the like), as well as aluminum, indium tin oxide, silver-coated copper, silver-coated aluminum, metal-coated spherical glass particles, silver-coated fibers, silver-coated resin particles, antimony-doped tin, tin oxide, carbon fibers, graphite, carbon black and mixtures thereof.

Considering the thermal conductivity and/or electrical conductivity, component (b) comprises preferably at least one metal selected from the group consisting of silver, nickel, copper, tin, aluminum, silver alloys, nickel alloys, copper alloys, tin alloys and aluminum alloys, more preferably at least one metal selected from the group consisting of silver, copper and nickel, even more preferably silver or copper, most preferably silver. In some embodiment, the conductive particles are silver particles. In another embodiment, the conductive particles are copper particles. As defined above, the silver and copper particles include coated powders comprising core particles coated with silver and copper, respectively.

The average particle diameter of component (b) is preferably 0.05 to 50 μm, more preferably 0.1 to 20 μm, and most preferably 0.1 to 15 μm. If the average particle diameter is too small, the particles constituting component (b) are aggregated and the physical properties are disadvantageously deteriorated. If the average particle diameter is too large, precipitation of component (b) occurs. As used herein, unless otherwise specified, the "average particle diameter" refers to a volume-based median diameter measured by laser diffractometry.

There is no particular limitation with respect to the shape of component (b). Component (b) may be in any shape, and the shape may be spherical, amorphous, flaky (scaly), filamentous (needle-like), dendritic or the like. Components (b) having different shapes may be used in combination.

From the viewpoint of thermal conductivity and electrical conductivity, the amount of component (b) is 10% by mass or more, preferably 20% by mass or more, based on the total mass of the resin composition of the present invention. If the amount of component (b) is too small, the resin composition exhibits insufficient (in some cases, almost no) heat conductivity or electrical conductivity after curing. Further, the amount of component (b) is typically 95% by mass or less, preferably 92% by mass or less, based on the total mass of the resin composition. If the amount of component (b) is too large, it becomes impossible to cause sufficient curing. In some embodiment, the amount of component (b) is 10% by mass to 95% by mass, typically 20% by mass to 95% by mass, based on the total mass of the resin composition of the present invention. In some embodiment, the amount of component (b) is 50% by mass to 95% by mass, typically 80% by mass to 95% by mass, based on the total mass of the resin composition of the present invention.

(c) Monocarboxylic Acid with a Number of Carbon Atoms of 3 or More (Component (c))

The resin composition of the present invention comprises a monocarboxylic acid with a number of carbon atoms of 3 or more (component (c)). A monocarboxylic acid is an organic compound having only one carboxyl group.

The monocarboxylic acid with a number of carbon atoms of 3 or more may be used individually or in combination.

As described above, when component (b) is added to component (a), component (a) cures disadvantageously in a short time even in the absence of the initiator. However, by the use of component (c), such unintended polymerization of component (a) is suppressed. That is, the use of component (c) improves the stability of component (a).

There is no particular limitation with respect to component (c) as long as this component is an organic compound having only one carboxyl group with a number of carbon atoms of 3 or more, and any of an aliphatic carboxylic acid and an aromatic carboxylic acid may be used. In some embodiment, the monocarboxylic acid as component (c) is an aliphatic monocarboxylic acid. The aliphatic monocarboxylic acid may be any of a saturated aliphatic monocarboxylic acid or an unsaturated aliphatic monocarboxylic acid. The aliphatic monocarboxylic acid may have any structure and the structure may be linear, branched and cyclic, but is preferably linear or branched. Component (c) may have a substituent as long as the effect of the present invention is not adversely affected. In some embodiment, the number of carbon atoms in the monocarboxylic acid as component (c) is 3 to 30, more typically 3 to 24. In another embodiment, a number of carbon atoms in the monocarboxylic acid as component (c) is 6 or more, more preferably 6 to 20.

When a monocarboxylic acid with a number of carbon atoms of less than 3 or an organic acid having a plurality of carboxyl groups (polycarboxylic acid), for example, a dicarboxylic acid, is used in place of component (c), the stability of component (a) in the presence of component (b) is insufficiently improved.

Examples of component (c) include, but are not limited to, propionic acid, acrylic acid, butyric acid, crotonic acid, isocrotonic acid, isobutyric acid, methacrylic acid, valeric acid, isovaleric acid, pivalic acid, caproic acid, sorbic acid, caprylic acid, 2-ethylhexanoic acid, cyclopentane carboxylic acid, cyclohexane carboxylic acid, lauric acid, myristic acid, palmitic acid, stearic acid, isostearic acid, oleic acid, linoleic acid, linolenic acid, cholic acid, pentafluoropropionic acid, pentachloropropionic acid, lactic acid, glycolic acid, pyruvic acid, glucuronic acid, benzoic acid, toluic acid, naphthalene-1-carboxylic acid, naphthalene-2-carboxylic acid, salicylic acid, nicotinic acid, cinnamic acid, mandelic acid, and the like. Component (c) which may have isomers is not limited to that having a specific structure.

From the viewpoint of high effectiveness of improving the stability of component (a), component (c) is preferably an aliphatic monocarboxylic acid, more preferably an aliphatic monocarboxylic acid with a number of carbon atoms of 6 or more, even more preferably an aliphatic monocarboxylic acid with a number of carbon atoms of 6 or more and 20 or less. In some embodiment, component (c) is preferably an aliphatic monocarboxylic acid with a number of carbon atoms of 18. In some embodiment, component (c) comprises at least stearic acid or oleic acid. In particular, component (c) preferably comprises oleic acid.

Regarding the amount of component (c), the mass ratio of component (c), relative to the entire resin composition of the present invention of 1, is preferably 0.0001 to 0.1, more preferably 0.0001 to 0.05, particularly preferably 0.0005 to 0.03. If the amount of component (c) is too small, the stability of component (a) may not be sufficiently improved and the pot life may be deteriorated. On the other hand, if the amount of component (c) is too large, the curability may be deteriorated.

There is no particular limitation with respect to the manner of addition of component (c). For example, it is possible to mix first component (a) and component (c) each containing no component (b), and then add, to the resulting mixture, component (b). Alternatively, it is possible to mix first component (b) and component (c) each containing no component (a), and then add, to the resulting mixture, component (a). As an example of the latter method, there can be mentioned a method comprising preparing component (b) coated with component (c) by surface-treatment of component (b) with component (c) and mixing the coated component (b) with component (a). As mentioned above, a mixture obtained by mixing component (a) and component (b) may be cured without the addition of component (c). However, if this mixture is not excessively rapidly cured, it is also possible to mix first component (a) and component (b), and then add, to the resulting mixture, component (c).

Component (b) may be surface-treated with any substance. Examples of the substance used for the surface treatment (surface treatment agent) include, but are not limited to, fatty acids (such as stearic acid), amines (such as isobutylamine and octylamine), silane coupling agents and the like. When component (b) used is surface-treated with component (c) (for example, fatty acids such as stearic acid) as mentioned above, at least a part of component (c) may be the component (c) used for the surface treatment of the component (b).

There is no particular limitation with respect to the method for the surface-treatment of component (b). For example, when a metal powder (for example, a silver powder) as component (b) is surface-treated with a fatty acid, examples of the method for the surface treatment include, but are not limited to, the following methods (1) to (3):

(1) a metal powder is added to a liquid fatty acid, the resultant mixture is stirred, and the metal powder to which the fatty acid is adhered is dried;

(2) a fatty acid (liquid or solid) is dissolved in a solvent, a metal powder is added to the obtained solution, the resultant mixture is stirred, and the metal powder to which the fatty acid solution is adhered is dried; and (3) a metal powder and then a solvent are added to a mixture of a liquid fatty acid and a solid fatty acid, the resultant mixture is stirred, and the metal powder to which the fatty acid solution is adhered is dried.

In the above-mentioned methods (1) to (3), any solvent, for example, an inorganic solvent such as water and/or an organic solvent such as an alcohol (for example, ethanol) can be used as the solvent. Further, a suitable agitator, such as a ball mill, may be used for the stirring.

Addition of an acidic component, such as a carboxylic acid, to component (a) for intentionally stopping polymerization initiated by a basic substance or suppressing unintended polymerization by a trace amount of a basic impurity has been conventionally known (for example, see Patent Document 2). However, unintentionally promoted polymerization of component (a) in the presence of component (b) and suppression of this polymerization by component (c), a monocarboxylic acid with a number of carbon atoms of 3 or more, were discovered first by the present inventors.

In some embodiment, the present invention relates to a method for preparing a resin composition comprising component (a), which comprises:

mixing components (a) and (b) to thereby obtain a mixture; and adding component (c) to the mixture to thereby obtain the resin composition.

In another embodiment, the present invention relates to a method for preparing a resin composition comprising component (a), which comprises:

mixing components (a) and (c) to thereby obtain a mixture; and adding component (b) to the mixture to thereby obtain the resin composition.

In yet another embodiment, the present invention relates to a method for preparing a resin composition comprising component (a), which comprises:

mixing component (b) and component (c) to thereby obtain a mixture; and adding component (a) to the mixture to thereby obtain the resin composition.

Preferred embodiments of components (a), (b), (c) and the like in the above-mentioned methods are identical with those in the resin composition of the present invention.

The stability of component (a) is deteriorated in the presence of component (b). This may be due to potential presence of sites on the surface of component (b), the sites having an activity to promote anionic polymerization of component (a). The reason why the stability is improved by the use of component (c) is unclear. However, involvement of the monocarboxylic acid with a number of carbon atoms of 3 or more in the mechanism of this stabilization is conceivable.

[Stabilizer]

The resin composition of the present invention may further comprise a stabilizer. Despite the fact that component (c) above also has the effect of stabilizing the resin composition, a stabilizer may further be used if necessary.

The stabilizer is a substance, other than component (c), for enhancing the stability of the resin composition during storage, and is added to suppress the occurrence of unintended polymerization reactions due to radicals or basic components. The 2-methylene-1,3-dicarbonyl compound may undergo unintended radical polymerization reactions triggered by radicals that are accidentally generated. Also, the 2-methylene-1,3-dicarbonyl compound may undergo anionic polymerization reactions due to contamination by extremely small amounts of basic components. The occurrence of such unintended polymerization reactions due to radicals or basic components can be suppressed by adding a stabilizer.

Stabilizers known in the art can be used as the stabilizer and, for example, a strong acid or a radical scavenger can be used. Specific examples of stabilizers include trifluoromethanesulfonic acid, methanesulfonic acid, phosphoric acid, N-nitroso-N-phenylhydroxylamine aluminum, triphenylphosphine, 4-methoxyphenol, hydroquinone and the like. Among these, preferable stabilizers are at least one member selected from methanesulfonic acid, N-nitroso-N-phenylhydroxylamine aluminum and 4-methoxyphenol. Stabilizers known in the art, such as those disclosed in JP 2010-117545 A and JP 2008-184514 A, can also be used as the stabilizer.

The stabilizer may be used individually or in combination.

The resin composition of the present invention may comprise, in addition to components (a) to (c) above, insulating particles, a surface treatment agent such as a coupling agent, a pigment, a plasticizer and the like, if necessary.

The resin composition of the present invention comprises components (a) to (c) above and, if necessary, may further comprise the above-mentioned components, such as a stabilizing agent, insulating particles and the like. The resin composition of the present invention can be prepared by mixing these components. Apparatuses known in the art can be used for mixing. For example, mixing can be performed by an apparatus known in the art, such as a Henschel mixer or a roll mill. These components may be mixed simultaneously, or it may be such that a portion of these components are mixed first and the remainder is mixed later.

The resin composition of the present invention may comprise components other than components (a) to (c) above and the above-mentioned stabilizer, insulating particles and the like, such as a flame retardant, an ion trapping agent, a defoaming agent, a leveling agent, a foam breaker and the like, as long as they do not impair the effectiveness of the present invention. If necessary, a solvent may be added to the resin composition of the present invention for adjustment of viscosity or the like. However, usually, no solvent is necessary because the viscosity of the resin composition of the present invention is relatively low.

[Initiator]

The resin composition of the present invention can be cured using an initiator. The initiator is expected to contribute to the polymerization initiation reaction when the resin composition is cured by the Michael addition reaction. The initiator used in the present invention comprises a basic substance. The basic substance used as the initiator in the present invention may be used individually or in combination.

The Basic substance used in the present invention typically comprises an organic base, an inorganic base or an organometallic material.

As examples of the organic base, there can be mentioned the amine compounds and the like described later. As examples of the inorganic base, there can be mentioned alkali metal hydroxides such as lithium hydroxide, sodium hydroxide, potassium hydroxide and cesium hydroxide; alkaline earth metal hydroxides such as calcium hydroxide; alkali or alkaline earth metal carbonates such as lithium carbonate, potassium carbonate and sodium carbonate; metal hydrogen carbonates such as potassium hydrogen carbonate and sodium hydrogen carbonate; and the like. As examples of the organometallic material, there can be mentioned organic alkali metal compounds such as butyllithium, t-butyllithium and phenyllithium, and organocopper reagents prepared therefrom; organic alkaline earth metal compounds such as methyl magnesium bromide, dimethyl magnesium and phenyl magnesium chloride, and organocopper reagents prepared therefrom; alkoxides such as sodium methoxide and t-butyl methoxide; and carboxylates such as sodium benzoate, and the like.

When the resin composition of the present invention is used for an electronic material, if the resin composition comprises an inorganic base or an organometallic material, there is concern that this may have unintended impact on electrical characteristics in the electric or electronic circuit in its vicinity. Therefore, the basic substance used in the present invention preferably does not comprise an alkali metal, an alkaline earth metal, a transition metal element or a halogen element. In another embodiment, the basic substance used in the present invention is non-ionic.

The basic substance used in the present invention is preferably an organic base, more preferably an amine compound. The above-mentioned amine compound is an organic compound having at least one of a primary amino group, a secondary amino group or a tertiary amino group within the molecule, and may have two or more amino groups of different classes within the same molecule at the same time.

As examples of the compound having a primary amino group, there can be mentioned, for example, methylamine, ethylamine, propylamine, butylamine, ethylenediamine, propylenediamine, hexamethylenediamine, diethylenetriamine, triethylenetetramine, ethanolamine, propanolamine, cyclohexylamine, isophoronediamine, aniline, toluidine, diaminodiphenylmethane, diaminodiphenylsulfone and the like.

As examples of the compound having a secondary amino group, there can be mentioned, for example, dimethylamine, diethylamine, dipropylamine, dibutylamine, dipentylamine, dihexylamine, dimethanolamine, diethanolamine, dipropanolamine, dicyclohexylamine, piperidine, piperidone, diphenylamine, phenylmethylamine, phenylethylamine and the like.

As examples of the compounds having a tertiary amino groups, there can be mentioned, for example, triethylamine, tributylamine, trihexylamine, triallylamine, 3-diethylaminopropylamine, dibutylaminopropylamine, tetramethylethylenediamine, tri-n-octylamine, dimethylaminopropylamine, N,N-dimethylethanolamine, triethanolamine, N,N-diethylethanolamine, N-methyl-N,N-diethanolamine, N,N-dibutylethanolamine, triphenylamine, 4-methyltriphenylamine, 4,4-dimethyltriphenylamine, diphenylethylamine, diphenylbenzylamine, N,N-diphenyl-p-anisidine, 1,1,3,3-tetramethylguanidine, N,N-dicyclohexylmethylamine, 1,4-diazabicyclo[2.2.2]octane, 2,6,10-trimethyl-2,6,10-triazaundecane, 1-benzylpiperidine, N,N-dimethylbenzylamine, N,N-dimethyldodecylamine, N-ethyl-N-methylbenzylamine, N,N-diethylbenzylamine and the like.

There is no particular limitation with respect to the compound having two or more amino groups of different classes within the same molecule at the same time. As examples of such compounds, there can be mentioned guanidine compounds, imidazole compounds and the like used as raw materials in the present embodiments. As examples of the guanidine compound, there can be mentioned dicyandiamide, methylguanidine, ethylguanidine, propylguanidine, butylguanidine, dimethylguanidine, trimethylguanidine, phenylguanidine, diphenylguanidine, toluylguanidine, 1,1,3,3-tetramethylguanidine and the like. As examples of the imidazole compound, there can be mentioned 2-ethyl-4-methylimidazole, 2-methylimidazole, 2-heptadecylimidazole, 2-phenyl-4,5-dihydroxymethylimidazole, 2-undecylimidazole, 2-phenyl-4-methyl-5-hydroxymethylimidazole, 2-phenyl-4-benzyl-5-hydroxymethylimidazole, 2,4-diamino-6-(2-methylimidazolyl-(1))-ethyl-S-triazine, 2,4-diamino-6-(2'-methylimidazolyl-(1)')-ethyl-S-triazine/isocyanuric acid adduct, 2-methylimidazole, 2-phenylidazole, 2-phenyl-4-methylimidazole, 1-cyanoethyl-2-phenylimidazole, 1-cyanoethyl-2-methylimidazole-trimelitate, 1-cyanoethyl-2-phenylimidazole-trimelitate, N-(2-methylimidazolyl-1-ethyl)-urea and N,N'-(2-methylimidazolyl-(1)-ethyl)-adipoyldiamide. However, the above-mentioned imidazole compounds are not limited to these compounds.

The above-mentioned amine compound preferably comprises a secondary or tertiary amino group. If the amino group contained in the amine compound is primary, possibility of suppression of the polymerization reaction by an active hydrogen generated from the amino group is increased. The above-mentioned amine compound more preferably comprises a tertiary amino group. In other words, the above-mentioned amine compound is more preferably a tertiary amine compound.

The above-mentioned amine compound is preferably free of an alkali metal, an alkaline earth metal, a transition metal element or a halogen element.

The above-mentioned amine compound is preferably free of an active hydrogen, such as that of a hydroxy group or a sulfhydryl group.

The molecular weight of the above-mentioned amine compound is preferably from 100 to 1,000, more preferably 100 to 500, and even more preferably 110 to 300. If the molecular weight of the amine compound is less than 100, its volatility is high, giving rise to concern that, among other things, it may affect components in the vicinity and cause the cured product the cured product to have variable physical properties. If the molecular weight of the amine compound exceeds 1,000, this may lead to, among other things, an increase in the viscosity of the amine compound and a decrease in the dispersibility of the amine compound in the resin composition are concerned.

In the present invention, the initiator may be used individually or in combination.

Specific examples of the amine compounds preferable as the initiator include, but are not limited to, triethylamine, 1,4-diazabicyclo [2.2.2] octane, 1,1,3,3-tetramethylguanidine, N,N-dimethylbenzylamine, N-ethyl-N-methylbenzylamine, 2,6,10-trimethyl-2,6,10-triazaundecane, N,N-dimethyloctylamine, N,N-dimethyloctadecylamine and N,N-dimethyldodecylamine, N,N-diisopropylethylamine and N,N-dicyclohexylmethylamine.

In the present invention, the initiator may be such that it has been rendered inactivated by separation or latentization and can be activated by any stimulus, such as heat, light, mechanical shear or the like. More specifically, the initiator may be a latent curing catalyst, such as a microcapsule, or those based on ion dissociation or an inclusion compound, and may be in a form that generates a base on exposure to heat, light, electromagnetic waves, ultrasonic waves, or physical shear.

In the present invention, the amount of the basic substance is preferably 0.01 mol % to 30 mol %, more preferably 0.01 mol % to 10 mol %, based on the total amount (100 mol %) of the 2-methylene-1,3-dicarbonyl compound in the resin composition. If the content of the basic substance is less than 0.01 mol %, it results in inconsistent curing. Conversely, if the content of the basic substance is more than 30 mol %, a large amount of the basic substance with no chemical bond formed with the resin matrix remains in the cured product, causing, among other things, deterioration in physical properties of the cured product as well as bleeding.

By curing with the above-mentioned initiator, the resin composition of the present invention provides a cured product having an electrical resistivity depending on its composition.

In some embodiment of the present invention, the cured product provided by the resin composition of the present invention has an electrical resistivity of 1000 μΩ·cm or less and 2 μΩ·cm or more at 25° C., typically 700 μΩ·cm or less and 2 μΩ·cm or more. However, if desired, the cured product provided by the resin composition of the present invention may have an electrical resistivity greater than 1000 μΩ·cm.

In some embodiment of the present invention, the resin composition of the present invention is that for the production of a conductive cured product. The curability is "conductive" means that the cured product has an electrical resistivity of 10,000 μΩ·cm or less. A conductive cured product is useful in applications where a certain degree of high electrical conductivity is required.

In some embodiment of the present invention, the resin composition of the present invention may be combined with an initiator to obtain a paste for electronic components. This paste for electronic components is particularly useful for manufacturing electronic components and semiconductor devices. The paste for electronic components of the present invention comprises the resin composition of the present invention and an initiator comprising at least one basic substance.

This paste for electronic components can be used as an adhesive, especially a one-part adhesive, since a curable resin composition is contained. Further, this paste for electronic components can be used as a solvent-free one-part adhesive. Such an adhesive is suitable for adhesion of electronic components. In a certain aspect, the present invention relates to a one-part adhesive comprising the resin composition and an initiator comprising at least one basic substance, particularly a one-part adhesive for electronic components. In another aspect, the present invention relates to a semiconductor device comprising the resin composition of the present invention or the adhesive of the present invention.

Further, the resin composition of the present invention as a base resin can be used in combination with a curing agent comprising the above-mentioned initiator comprising at least one basic substance to thereby form a two-part mixing adhesive.

In the application of the paste for electronic components, a jet dispenser, an air dispenser or the like can be used. Further, a conventionally known coating method (such as dip coating, spray coating, bar coating, gravure coating, reverse gravure coating and spin coating) and a conventionally known printing method (such as planographic printing, Carton printing, metal printing, offset printing, screen printing, gravure printing, flexographic printing, inkjet printing) can be used. In some embodiment, the paste for electronic components of the present invention can be cured at room temperature without heating. In another embodiment, the paste for electronic components of the present invention can be cured by heating to a temperature of 150° C. or less, for example, 25 to 80° C. In this case, the heating temperature is preferably 50 to 80° C. The heating time is typically 0.5 to 4 hours, preferably 0.5 to 2 hours.

In the present invention, also provided is a cured product obtained by curing the resin composition of the present invention. In the present invention, also provided is a cured product obtained by curing the paste for electronic components of the present invention.

In addition, in the present invention, also provided is a semiconductor device comprising a cured product of the resin composition of the present invention or a cured product of the paste for electronic components of the present invention.

In the present invention, also provided is a method for adhering members of electronic components comprising applying the resin composition of the present invention to a first member of electronic components and contacting the composition with a second member of electronic components. Also provided is a method for adhering members of electronic components comprising injecting the resin composition of the present invention between a first member of electronic components and a second member of electronic components. In some embodiment of these method for adhering members of electronic components, the application or injection is performed by jet dispensing or air dispensing. Further, also provided is a method for adhering electronic components onto a substrate comprising applying the resin composition of the present invention to the electronic components or the substrate. In the method for adhering electronic components onto a substrate, the application may be carried out by injection, or by jet dispensing or air dispensing. In the method for adhering electronic components onto a substrate, the electronic components may be semiconductor devices. Further, also provided is a method for coating electronic components comprising applying the resin composition of the present invention to at least a part of the surface of the electronic components. In the method for coating electronic components, the application may be carried out by spray coating or by a printing method such as screen printing through a mask.

In some embodiment, the cured product of the resin composition of the present invention or the cured product of the paste for electronic components of the present invention is an electrically conductive material and can be used for applications based on its electrical conductivity. For example, these cured products can be used for making a member of an actuator for preventing electrical charging associated with its operation. Further, the cured product of the resin composition of the present invention or the cured product of the paste for electronic components of the present invention can be used as an electromagnetic wave shielding material. In the present invention, also provided is an electromagnetic wave shielding material comprising the cured product of the resin composition of the present invention or the cured product of the paste for electronic components of the present invention. More specifically, the resin composition of the present invention or the paste for electronic components of the present invention can be used for assembly of various modules for the semiconductor device, or the like, which modules require blocking of electromagnetic waves coming from outside or generated inside. Further, the cured product of the resin composition of the present invention can be used as a conductive pattern of a printed wiring board.

In another embodiment, the cured product of the resin composition of the present invention, or the cured product of the paste for electronic components of the present invention is thermally conductive. In this case, the thermal conductivity of the thermally conductive cured product is typically 0.5 to 250 W/m·K.

EXAMPLES

Examples and comparative examples of the present invention will be described below. The present invention is not limited to the following examples and comparative examples.

Preparation of Resin Composition

The raw materials of the resin compositions used in the following Examples and Comparative Examples are as follows:

2-methylene-1,3-dicarbonyl Compound (Component (a))

(a-1) DHMM (manufactured by Sirrus Inc.)

(a-2) DCHMM (manufactured by Sirrus Inc.)

The specific structures of the above-mentioned 2-methylene-1,3-dicarbonyl compounds are as shown by the chemical formulae in Table 1 below.

TABLE 1

| | | |
|---|---|---|
| DCHMM | Dicyclohexyl methylene malonate | 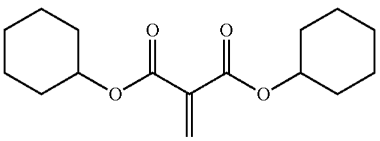 [SMILES: C=C(C(=O)OC1CCCCC1)C(=O)OC1CCCCC1] |
| DHMM | Dihexyl methylene malonate | 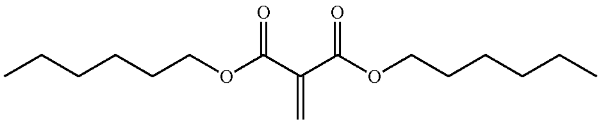 [SMILES: C=C(C(=O)OCCCCCC)C(=O)OCCCCCC] |

Conductive Particles (Component (b)):

(b-1) Silver particles (no surface treatment) (average particle diameter: 5 μm, shape: spherical)

(b-1a) Silver particles (component (b-1) above surface-treated with octylamine (Wako Pure Chemical Industries, Ltd.), ig.loss value: 0.9%)

(b-1b) Silver particles (component (b-1) above surface-treated with stearic acid (New Japan Chemical Co., Ltd.), ig.loss value: 0.7%)

(b-1c) Silver particles (component (b-1) above surface-treated with oleic acid (NOF CORPORATION), ig.loss value: 0.7%)

(b-2) Copper Particles (no surface treatment) (average particle diameter: 2.5 μm, shape: spherical)

(b-2a) Copper particles (component (b-2) above surface-treated with oleic acid (NOF CORPORATION), ig.loss value: 0.9%)

The ig.loss value (ignition loss) was calculated from the mass of the calcination residue obtained by subjecting the surface-treated silver or copper particles above after drying to calcination at 800° C. for 5 minutes after heating to 800° C. at the rate of 20° C./min.

Surface Treatment of Component (b)

A mixture of 100 g of component (b-1), 2 g of various acid or amine and 10 g of ethanol was stirred in a pot mill to perform surface treatment of silver particles to prepare components (b-1a) to (b-1c).

A mixture of 100 g of component (b-2), 2 g of oleic acid and 10 g of ethanol was stirred in a pot mill to perform surface treatment of copper particles to prepare component (b-2a).

Monocarboxylic Acid (Component (c)):

(c-1) Propionic acid (3 carbon atoms, Wako Pure Chemical Industries, Ltd.);

(c-2) Sorbic acid (6 carbon atoms, Wako Pure Chemical Industries, Ltd.);

(c-3) Stearic acid (18 carbon atoms, New Japan Chemical Co., Ltd.);

(c-4) Isostearic Acid (18 carbon atoms, Nissan Chemical Industries, Ltd.);

(c-5) Oleic acid (18 carbon atoms, NOF CORPORATION);

The above-mentioned isostearic acid has the following structure:

[Chemical formula 8]

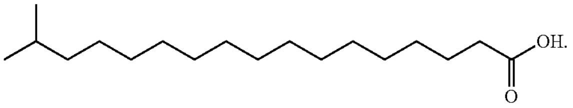

Monocarboxylic acid with low number of carbon atoms, or dicarboxylic acid (component (c')):

(c'-1) Acetic acid (2 carbon atoms, Wako Pure Chemical Industries, Ltd.)

(c'-2) Malonic acid (3 carbon atoms, Wako Pure Chemical Industries, Ltd.)

(c'-3) Maleic Acid (4 carbon atoms, Wako Pure Chemical Industries, Ltd.)

Examples 1 to 21 and Comparative Examples 1 to 15

Component (a), component (b) and component (c) (or component (c')) were charged into an ointment bottle (30 ml, made of polypropylene) in accordance with the compositions shown in Table 2 to 7 (each of the amounts in the compositions shown in these tables is given in weight (unit: g)). The contents in the ointment bottle were stirred with a spatula, and then mixed with a hybrid mixer at room temperature (20 to 25° C.) for 15 seconds to thereby obtain a resin composition. By visual observation and from feel in a hand, the resultant resin compositions were judged to be homogeneous. The pot life of the resin composition was measured as described later.

The amounts of the various surface treatment agents in the resin composition were calculated from the above ig.loss values. As mentioned above, component (c-5) and component (c-3) are respectively used in components (b-1c) and (b-2a) and component (b-1b) as surface treatment agents. With regard to each of these components (b), the type and amount of component (c) used as the surface treatment agent are given in the item of the table "Agent for surface treatment of component (b)" section of the table. In each of Tables 2 to 7, the amount given in the item "component (b)" does not include the amount of the surface treatment agent, and the amount given in the item "component (c)" does not include the amount of component (c) used as the surface treatment agent.

Measurement of Pot Life of the Resin Composition

The resin composition in the ointment bottle (the lid was closed immediately after completion of preparation) immediately after the above-mentioned preparation was allowed to stand at room temperature (20 to 25° C.). The viscosity of the resin composition was checked at predetermined points of time, and the time taken to detect clear increase in viscosity of the resin composition, from the point of time at which the resin composition began to be allowed to stand, was regarded as the pot life (unit: hour).

The viscosity of the resin composition was checked as follows. The lid of the ointment bottle was opened and the resin composition in the bottle was stirred with a spatula. When clear increase in force required for the stirring (judged by feel in a hand) was detected, clear increase in viscosity of the resin composition was regarded as being detected.

The viscosity was checked at 1 hour intervals up to 12 hours after the resin composition began to be allowed to stand. However, with respect to the resin composition in which no clear increase in viscosity was detected within 12 hours after the resin composition began to be allowed to stand, a newly prepared sample of the resin composition was allowed to stand at room temperature for 12 hours, and the viscosity was checked at 1 hour intervals up to 24 hours after resin composition began to be allowed to stand. When no clear increase in viscosity of this sample was detected within 24 hours after the resin composition began to be allowed to stand, the test was continued in the same manner until clear increase in viscosity was detected, except that the viscosity was checked at 24 hour intervals.

TABLE 2

| | | Comparative Example 1 | Example 1 | Example 2 | Example 3 | Example 4 | Example 5 | Example 6 |
|---|---|---|---|---|---|---|---|---|
| Component (a) | (a-1) | 0.70 | 0.70 | 0.70 | 0.70 | 0.70 | 0.70 | 0.70 |
| | (a-2) | | | | | | | |
| Component (b) | (b-1) | 4.30 | 4.30 | 4.30 | 4.30 | 4.30 | 4.30 | 4.30 |
| | (b-1a) | | | | | | | |
| | (b-1b) | | | | | | | |
| | (b-1c) | | | | | | | |
| | (b-2) | | | | | | | |
| | (b-2a) | | | | | | | |
| Agent for surface treatment of component (b) | Type | — | — | — | — | — | — | — |
| | Amount | — | — | — | — | — | — | — |
| Component (c) | (c-1) | | 0.05 | 0.10 | 0.50 | | | |
| | (c-2) | | | | | 0.05 | 0.10 | 0.50 |
| | (c-3) | | | | | | | |
| | (c-4) | | | | | | | |
| | (c-5) | | | | | | | |
| Component (c') | (c'-1) | | | | | | | |
| | (c'-2) | | | | | | | |
| | (c'-3) | | | | | | | |
| Pot life (hour) | | 10 | 15 | 17 | 24 | 15 | 24 | 24 |

TABLE 3

| | | Example 7 | Example 8 | Example 9 | Example 10 | Example 11 | Example 12 | Comparative Example 2 | Comparative Example 3 | Comparative Example 4 |
|---|---|---|---|---|---|---|---|---|---|---|
| Component (a) | (a-1) | 0.70 | 0.70 | 0.70 | 0.70 | 0.70 | 0.70 | 0.70 | 0.70 | 0.70 |
| | (a-2) | | | | | | | | | |
| Component (b) | (b-1) | 4.30 | 4.30 | 4.30 | 4.30 | 4.30 | 4.30 | 4.30 | 4.30 | 4.30 |
| | (b-1a) | | | | | | | | | |
| | (b-1b) | | | | | | | | | |
| | (b-1c) | | | | | | | | | |
| | (b-2) | | | | | | | | | |
| | (b-2a) | | | | | | | | | |
| Agent for surface treatment of component (b) | Type | — | — | — | — | — | — | — | — | — |
| | Amount | — | — | — | — | — | — | — | — | — |
| Component (c) | (c-1) | | | | | | | | | |
| | (c-2) | | | | | | | | | |
| | (c-3) | | | | | | | | | |
| | (c-4) | 0.05 | 0.10 | 0.50 | | | | | | |
| | (c-5) | | | | 0.05 | 0.10 | 0.50 | | | |
| Component (c') | (c'-1) | | | | | | | 0.50 | | |
| | (c'-2) | | | | | | | | 0.50 | |
| | (c'-3) | | | | | | | | | 0.50 |
| Pot life (hour) | | 17 | 24 | 24 | 24 | 48 | 72 | 10 | 10 | 10 |

TABLE 4

| | | Comparative Example 5 | Example 13 | Example 14 | Comparative Example 6 | Example 15 | Comparative Example 7 | Comparative Example 8 | Example 16 | Example 17 | Comparative Example 9 | Example 18 |
|---|---|---|---|---|---|---|---|---|---|---|---|---|
| Component (a) | (a-1) | 0.70 | 0.70 | 0.70 | 0.70 | 0.70 | | | | | | |
| | (a-2) | | | | | | 0.70 | 0.70 | 0.70 | 0.70 | 0.70 | 0.70 |
| Component (b) | (b-1) | | | | | | 4.30 | | | | | |
| | (b-1a) | 4.26 | | | | | | 4.26 | | | | |
| | (b-1b) | | 4.27 | | | | | | 4.27 | | | |
| | (b-1c) | | | 4.27 | | | | | | 4.27 | | |
| | (b-2) | | | | 4.30 | | | | | | 4.30 | |
| | (b-2a) | | | | | 4.26 | | | | | | 4.26 |
| Agent for surface treatment of component (b) | Type | *1 | (c-3) | (c-5) | — | (c-5) | — | *1 | (c-3) | (c-5) | — | (c-5) |
| | Amount | 0.04 | 0.03 | 0.03 | — | 0.04 | — | 0.04 | 0.03 | 0.03 | — | 0.04 |
| Component (c) | (c-1) | | | | | | | | | | | |
| | (c-2) | | | | | | | | | | | |
| | (c-3) | | | | | | | | | | | |
| | (c-4) | | | | | | | | | | | |
| Component (c') | (c'-1) | | | | | | | | | | | |
| | (c'-2) | | | | | | | | | | | |
| | (c'-3) | | | | | | | | | | | |
| | (c'-4) | | | | | | | | | | | |
| Pot life (hour) | | 6 | 17 | 72 | 7 | 72 | 12 | 7 | 18 | 72 | 8 | 72 |

*1: octylamine

TABLE 5

| | | Example 19 | Example 20 | Example 21 | Example 22 | Example 23 | Example 24 |
|---|---|---|---|---|---|---|---|
| Component (a) | (a-1) | 0.70 | 0.70 | 0.70 | 0.70 | 0.70 | 0.70 |
| | (a-2) | | | | | | |
| Component (b) | (b-1) | | | | | | |
| | (b-1a) | | | | | | |
| | (b-1b) | 4.27 | 4.27 | 4.27 | 4.27 | 4.27 | 4.27 |
| | (b-1c) | | | | | | |
| | (b-2) | | | | | | |
| | (b-2a) | | | | | | |
| Agent for surface treatment of component (b) | Type | (c-3) | (c-3) | (c-3) | (c-3) | (c-3) | (c-3) |
| | Amount | 0.03 | 0.03 | 0.03 | 0.03 | 0.03 | 0.03 |
| Component (c) | (c-1) | 0.05 | 0.10 | 0.50 | | | |
| | (c-2) | | | | 0.05 | 0.10 | 0.50 |

TABLE 5-continued

| | | Example 19 | Example 20 | Example 21 | Example 22 | Example 23 | Example 24 |
|---|---|---|---|---|---|---|---|
| | (c-3) | | | | | | |
| | (c-4) | | | | | | |
| | (c-5) | | | | | | |
| Component (c') | (c'-1) | | | | | | |
| | (c'-2) | | | | | | |
| | (c'-3) | | | | | | |
| Pot life (hour) | | 24 | 24 | 20 | 72 | >72 | >72 |

TABLE 6

| | | Example 25 | Example 26 | Example 27 | Example 28 | Example 29 | Example 30 |
|---|---|---|---|---|---|---|---|
| Component (a) | (a-1) | 0.70 | 0.70 | 0.70 | 0.70 | 0.70 | 0.70 |
| | (a-2) | | | | | | |
| Component (b) | (b-1) | | | | | | |
| | (b-1a) | | | | | | |
| | (b-1b) | 4.27 | 4.27 | 4.27 | 4.27 | 4.27 | 4.27 |
| | (b-1c) | | | | | | |
| | (b-2) | | | | | | |
| | (b-2a) | | | | | | |
| Agent for surface | Type | (c-3) | (c-3) | (c-3) | (c-3) | (c-3) | (c-3) |
| component (b) | Amount | 0.03 | 0.03 | 0.03 | 0.03 | 0.03 | 0.03 |
| treatment of | | | | | | | |
| Component (c) | (c-1) | | | | | | |
| | (c-2) | | | | | | |
| | (c-3) | 0.05 | 0.10 | 0.50 | | | |
| | (c-4) | | | | | | |
| | (c-5) | | | | 0.05 | 0.10 | 0.50 |
| Component (c') | (c'-1) | | | | | | |
| | (c'-2) | | | | | | |
| | (c'-3) | | | | | | |
| Pot life (hour) | | 72 | >72 | 72 | 72 | >72 | >72 |

TABLE 7

| | | Example 31 | Example 32 | Example 33 | Example 34 | Example 35 | Example 36 |
|---|---|---|---|---|---|---|---|
| Component (a) | (a-1) | 0.70 | 0.70 | 0.70 | 0.70 | 0.70 | 0.70 |
| | (a-2) | | | | | | |
| Component (b) | (b-1) | | | | | | |
| | (b-1a) | 4.26 | 4.26 | 4.26 | | | |
| | (b-1b) | | | | | | |
| | (b-1c) | | | | | | |
| | (b-2) | | | | 4.30 | 4.30 | 4.30 |
| | (b-2a) | | | | | | |
| Agent for surface | Type | *1 | *1 | *1 | — | — | — |
| treatment of | Amount | 0.04 | 0.04 | 0.04 | — | — | — |
| component (b) | | | | | | | |
| Component (c) | (c-1) | | | | | | |
| | (c-2) | | | | | | |
| | (c-3) | | | | | | |
| | (c-4) | | | | | | |
| | (c-5) | 0.05 | 0.10 | 0.50 | 0.05 | 0.10 | 0.50 |
| Component (c') | (c'-1) | | | | | | |
| | (c'-2) | | | | | | |
| | (c'-3) | | | | | | |
| Pot life (hour) | | 12 | 24 | 72 | 24 | 48 | <72 |

*1: octylamine (Discussion of Results)

Examples 1 to 12 and 34 to 36 and Comparative Examples 1, 6, 7, and 9 show that unintended curing of component (a) is caused in the presence of component (b), and that by the addition of component (c), the pot life of the resin composition in the presence of component (b) is extended, as compared to that for the resin composition with no component (c) added, i.e., the stability of component (a) is improved.

Example 13 to 18 and Comparative Examples 5 and 8 show that the addition of component (c) as an agent for surface treatment of component (b) also improves the stability of component (a) in the presence of component (b).

Examples 13 and 19 to 30 show that the surface treatment of component (b) with component (c) in combination with addition of component (c) separately from that for the surface treatment, the pot life of the resin composition in the presence of component (b) is extended, as compared to that for the resin composition with no component (c) added.

Examples 31 to 33 and Comparative Example 5 show that by the addition of component (c), the pot life of the resin composition is extended, as compared to that for the resin composition with no component (c) added, even if component (b) is surface-treated with an agent other than component (c).

Comparative Example 1 to 4 show that a monocarboxylic acid with a number of carbon atoms of less than 3 or a polycarboxylic acid, such as a dicarboxylic acid, does not exhibit, despite the fact that it is an organic compound with a carboxyl group, an effect of improving the stability of component (a) in the presence of component (b).

INDUSTRIAL APPLICABILITY

By the use of the resin composition of the present invention, unintended curing of the 2-methylene-1,3-dicarbonyl compound in the presence of conductive particles is suppressed, so that a paste for electronic components, which comprises the 2-methylene-1,3-dicarbonyl compound, can be easily produced.

The disclosure of Japanese Patent Application No. 2019-226531 (filed on Dec. 16, 2019) is incorporated herein by reference in its entirety.

All publications, patent applications, and technical standards mentioned in the present specification are incorporated herein by reference to the same extent as if such individual publication, patent application, or technical standard was specifically and individually indicated to be incorporated by reference.

The invention claimed is:

1. A resin composition comprising the following components (a) to (c):

(a) at least one 2-methylene-1,3-dicarbonyl compound;

(b) at least one type of conductive particles; and (c) at least one monocarboxylic acid with a number of carbon atoms of 3 or more.

2. The resin composition according to claim 1, wherein the at least one type of conductive particles comprise silver or copper.

3. The resin composition according to claim 1, which is used for manufacturing a conductive cured product.

4. The resin composition according to claim 1, wherein the monocarboxylic acid is a saturated or unsaturated aliphatic monocarboxylic acid.

5. The resin composition according to claim 4, wherein the at least one type of conductive particles comprise silver or copper.

6. The resin composition according to claim 4, wherein the saturated or unsaturated aliphatic monocarboxylic acid is linear or branched.

7. The resin composition according to claim 6, wherein the at least one type of conductive particles comprise silver or copper.

8. The resin composition according to claim 4, wherein the number of carbon atoms in the saturated or unsaturated aliphatic monocarboxylic acid is 6 or more.

9. The resin composition according to claim 8, wherein the at least one type of conductive particles comprise silver or copper.

10. A paste for electronic components, which comprises the resin composition of claim 1 and an initiator comprising at least one basic substance.

11. The paste for electronic components according to claim 10, which can be cured by heating to a temperature of 150° C. or less.

12. A semiconductor device comprising the paste for electronic components of claim 10.

13. A cured product obtained by curing the paste for electronic components of claim 10.

14. An electromagnetic wave shielding material comprising the cured product of claim 13.

15. A semiconductor device comprising the cured product of claim 13.

16. A paste for electronic components, which comprises the resin composition of claim 4 and an initiator comprising at least one basic substance.

17. A paste for electronic components, which comprises the resin composition of claim 6 and an initiator comprising at least one basic substance.

18. A paste for electronic components, which comprises the resin composition of claim 8 and an initiator comprising at least one basic substance.

19. A paste for electronic components, which comprises the resin composition of claim 2 and an initiator comprising at least one basic substance.

* * * * *